SCRAMBLED TELEVISION APPARATUS AND METHOD

Filed Oct. 10, 1957 2 Sheets-Sheet 1

INVENTOR.
DONATO D'AGOSTINI
BY Rines and Rines
ATTORNEYS

INVENTOR.
DONATO D'AGOSTINI
BY Rines and Rines
ATTORNEYS

3,069,492
SCRAMBLED TELEVISION APPARATUS AND METHOD

Donato D'Agostini, Newark, N.J., assignor to Blonder-Tongue Electronics, a corporation of New Jersey Filed Oct. 10, 1957, Ser. No. 689,379
22 Claims. (Cl. 178—5.1)

The present invention relates to television transmission and reception and, more particularly, to systems and methods for scrambling and unscrambling television images.

Numerous proposals have been offered for rendering the reception of television transmissions intelligible or unusable except for receivers that, through appropriate subscription to a special service, are equipped to unscramble the intelligibility and reproduce a proper image. As an illustration, it has been proposed to switch the polarity of the video-signal transmission at the transmitter in order alternately to transmit a normal or positive picture and an inverted or negative picture that results, through persistency of vision, in the reception of no picture at all at the ordinary receiver. A subscriber to this television service, however, would receive special unscrambling signals, as, for example, over the telephone lines or by a pre-arranged code transmission, which would permit unscrambling by restoring the polarity of the alternate pictures back to the normal or positive polarity, thus to reproduce a proper television image or picture. Such systems have, however, been subject to numerous disadvantages including complexity and relatively high cost of installation and operation, and, in certain systems, variation in the synchronization pulse amplitude and frequency.

An object of the present invention is to provide a new and improved system for and method of scrambling and unscrambling that shall not be subject to any of the above disadvantages and that, to the contrary, shall require but an inexpensive modification of existing television equipment or the purchase by the user of a moderately priced conversion apparatus. The end is achieved, in summary, by generating an auxiliary carrier wave corresponding to the main video-signal modulated carrier wave but one hundred eighty degrees out of phase therewith and of amplitude corresponding to a black-signal amplitude of the main video-signal carrier wave, and selectively combining the main and auxiliary carrier waves at preselected time intervals only between predetermined sets of the successive video frames. Further details are, of course, later presented.

A further object is to provide such a novel system and method that shall have a great degree of flexibility, rendering it adaptable for any desired unscrambling technique, whether it be by telephone line signals or by a cyclic sequence pre-arranged for particular programs, or by other techniques.

An additional object is to provide a system and method that shall permit of easy modification to transmit one or more auxiliary programs of advertising or other nature to all receivers, or to transmit short intervals of the main program to entice the viewer to use the special service that will enable reception of an intelligible main program.

Other and further objects will be explained hereinafter and will be particularly pointed out in the appended claims.

The invention will now be described in connection with accompanying drawing,

FIG. 1 of which is a wave-form diagram of a standard television video signal-modulated carrier that is modified in accordance with the present invention to produce the novel results thereof;

Figures 1, 2, 3:
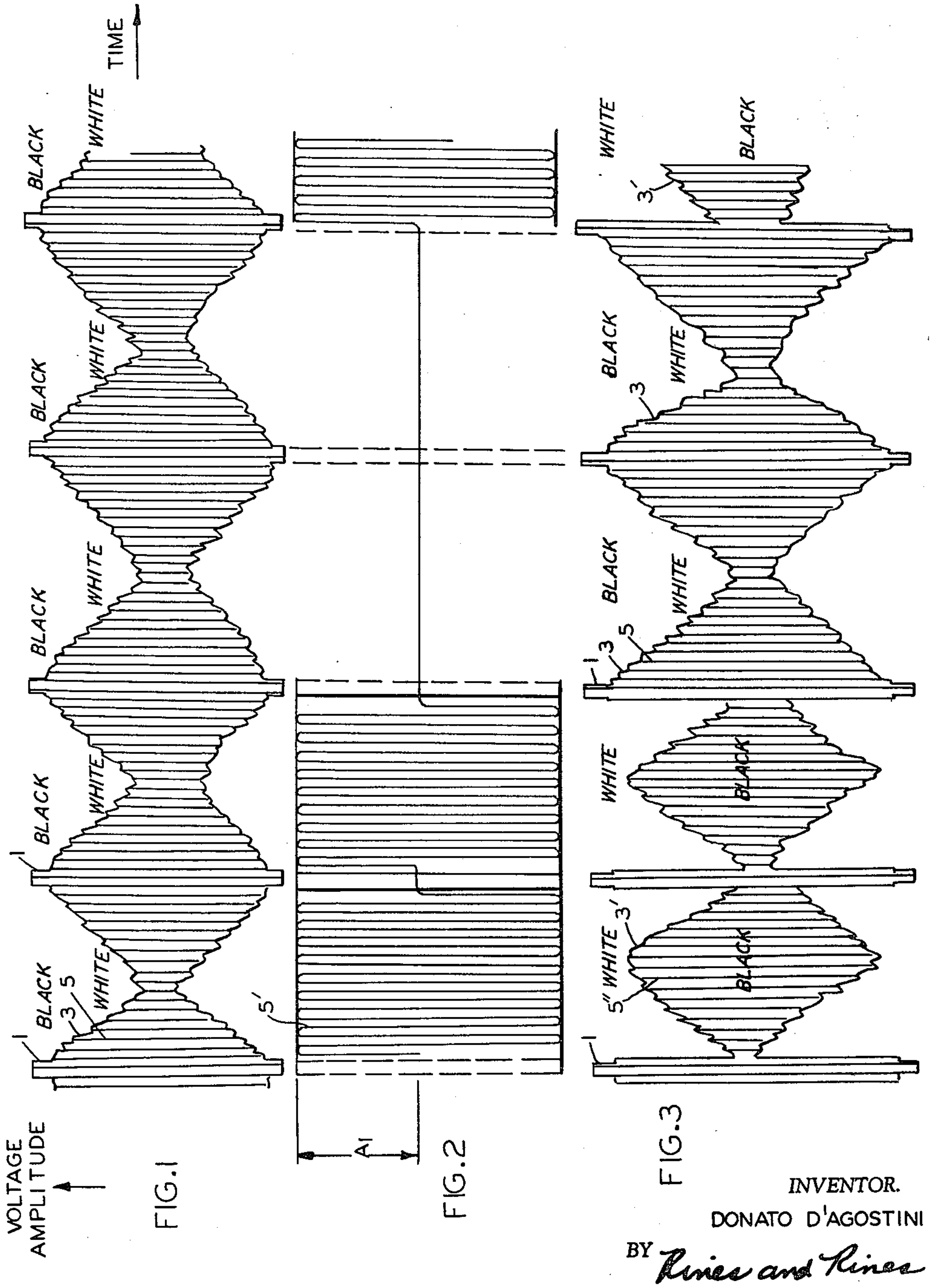
FIG. 2 is a similar wave-form diagram of a modifying auxiliary carrier.
FIG. 3 is a similar wave-form diagram of the combined composite scrambled wave-forms of FIGS. 1 and 2.

In the wave-form diagrams of FIGS. 1, 2 and 3, time is plotted along the abscissa as a function of voltage amplitude, plotted along the ordinate. A little more than four successive lines of a standard television video transmission are illustrated in FIG. 1, each line being initiated by a synchronizing pulse 1 followed by the video or picture signal intelligence between synchronizing pulses of successive lines. The video signal varies from the high-amplitude "black" to the low-amplitude "white" being carried as an amplitude modulation 3 upon the main video-signal radio-frequency carrier wave 5. This signal is scrambled, in accordance with the invention, by combining with the main carrier 5, at preselected intervals of time only, between predetermined sets of lines, auxiliary carrier-wave oscillations 5′, FIG. 2, adjusted to be substantially one hundred and eighty degrees different in phase from the phase of the main video carrier 5, FIG. 1, and of amplitude $A_1$, substantially equal to the full "black" video signal amplitude 3. In FIG. 2, the auxiliary carrier 5′ is shown applied synchronously with the first and second lines in the intervals between the synchronizing pulses 1, and during the fifth line, the initial part of which is illustrated. The resultant carrier 5″ of FIG. 3, representing the combination of the main video-signal modulated carrier 3, 5 of FIG. 1 and the auxiliary carrier 5′ of FIG. 2, will be observed to provide an apparent reversal of polarity of the video signal 3′ in the first and second lines and again in the fifth line, but maintaining the original polarity during the third and fourth lines. The labels "white" and "black" of the first pair of lines and the fifth line thus appear one below the other, whereas they appear in reverse order in the first, second and fifth lines of FIG. 1.

An ordinary television receiver receiving the transmission of FIG. 3 would show periodically, at a rapid rate, proper and reversed video images, the net result of which, to the eye of the observer, in view of persistency of vision, would be no image or picture at all. The scrambled program of FIG. 3 could thus not be received by a conventional receiver. A properly equipped receiver, however, such as one belonging to a subscriber to the service transmitting the program of FIG. 3, would have a de-coding mechanism for re-reversing the polarity of the first pair of lines and the fifth line, thus to show the video signal in proper polarity at all times and thence to reproduce the program.

Figure 4:
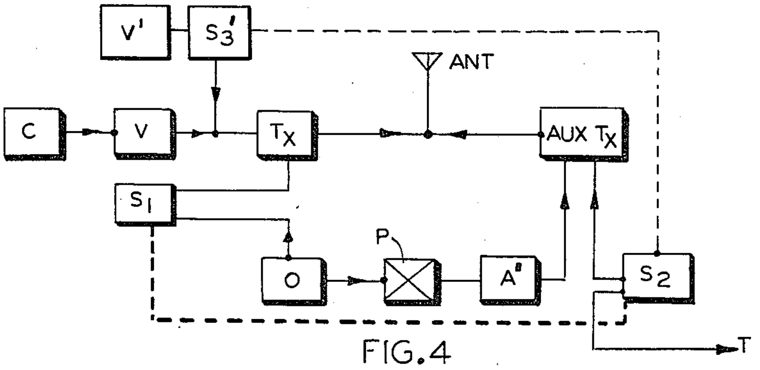
FIGS. 4 and 6 are block diagrams of a transmitter for producing the composite scrambled signal of FIG. 3.

A conventional video-image camera C, FIG. 4, picks up the light image to be televised, with all its shades and gradations of black and white, and amplifies the video signals in conventional video amplifiers V, which amplified signals amplitude-modulate the transmitter $T_x$ as at 3, FIG. 1, the main carrier-wave radio-frequency oscillations 5 of which are generated by an oscillator O. The resulting video-signal-modulated main carrier 3, 5 may be transmitted by an antenna ANT or otherwise disseminated, as is well known. In accordance with a feature of the invention, the carrier-frequency oscillations 5 may be changed one-hundred eighty degrees in phase by any conventional phase changer P, as at 5′, FIG. 2, with its amplitude adjusted in an amplifier A′, as is well-known, to generate in the auxiliary carrier transmitter Aux $T_x$, an amplitude $A_1$, FIG. 2, corresponding substantially to the full black-signal amplitude "black" of FIG. 1. The auxiliary transmitter carrier oscillations 5′, however, are combined, in the manner of any well-known conventional dual-video-signal carrier combination transmission (as discussed, for example, in Tele-Tech, November 1951, pages 50 through 52; in Electronic and Radio Engineering, 1955, F. E. Terman, pages 542 through 544; or in the Proceedings of the Institute of Engineers, December 1956, pages 1676 through 1679), with the main carrier oscillations 5 from the transmitter $T_x$ only at certain preselected time intervals as determined by a code-operated gating or switching circuit or device $S_2$ that permits the auxiliary carrier oscillations 5' to emanate from the auxiliary transmitter Aux $T_x$ only upon operation of the switching circuit or device $S_2$. The code-operated switching device $S_2$ may be, for example, any conventional pulse generator, as of the multivibrator or blocking-oscillator type, responsive to the synchronization pulses 1 of each line to produce an output pulse immediately following the synchronization pulses 1 for the time interval between adjacent lines. It is preferred, in accordance with the invention, that the operation of the auxiliary carrier transmitter Aux $T_x$ be confined to the periods or intervals between successive line synchronization pulses since the very desirable end of maintaining the synchronization pulse amplitudes unchanged is attained.

Through proper selection of the time constants of the multivibrator, blocking oscillator or other switching circuit or device $S_2$, the auxiliary transmitter Aux $T_x$ may be gated or switched at periodic intervals to permit its auxiliary oscillations 5' to combine with the video-signal-modulated oscillations 3, 5 of the main video carrier transmitter $T_x$. In FIG. 2, for example, the switching circuit $S_2$ produces gating pulses to operate the auxiliary transmitter Aux $T_x$ between the synchronizing pulses 1 of the first and second and of the second and third lines, but not during the third or fourth line. This may simply be accomplished if the recovery time constants of the multivibrator or similar coded switching circuit $S_2$, triggered by the synchronizing pulses 1, are only sufficiently long to permit of operation in response to two successive synchronizing pulses, the circuit being activated again at the fifth line, as shown. Other types of code-operated switching devices $S_2$ may obviously also be used, the circuit preferably randomly selecting sets or pairs of frames and not the same pair or same frame every so many frames. The free-running multivibrator or blocking oscillator, occasionally locked into synchronization with the pulses 1 may achieve such random selection of frames, and other random pulse generators may, of course, also be used, as is well known.

The code of pulses representing the preselected frames between which the auxiliary transmitter Aux $T_x$ is to operate, will also be transmitted at T either along a telephone line for the use of a subscriber at a receiver, or along any other code-sequence transmission system.

If, furthermore, no signal at all is transmitted for a line, every so often, the missing video carrier will produce in all non-subscriber inter-carrier receivers, an unpleasant sound. This may be effected by a code-operated switch $S_1$, such as a motor-driven switch or timing circuit that may periodically disconnect the main carrier oscillator O from the transmitter $T_x$, suppressing the main carrier. The non-subscriber receiver will thus receive no usable visual signal at all in view of the scrambled transmission of FIG. 3, and an unusable sound program, as well.

Figures 5, 6:
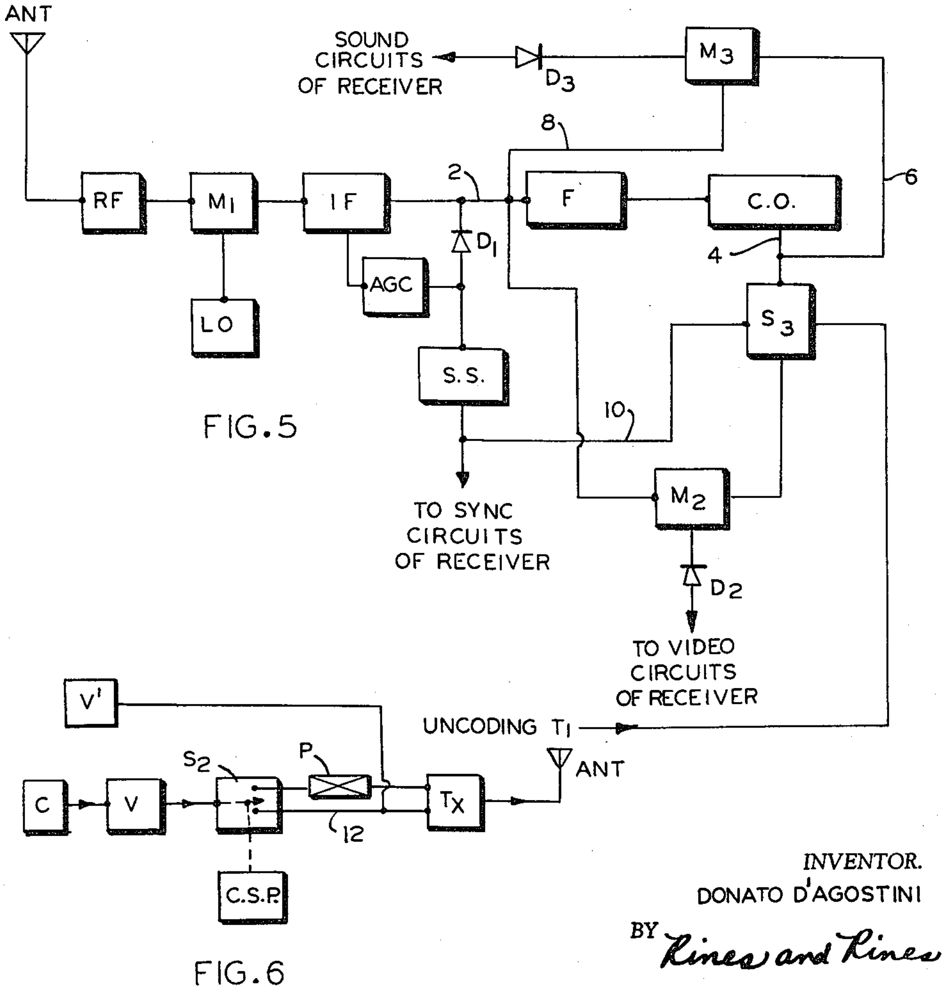
FIG. 5 is a block diagram of an appropriate unscrambling receiving system.

In the receiving system of FIG. 5, the circuit is quite conventional with radio-frequency RF, local oscillator LO, first detector or mixer $M_1$, intermediate-frequency IF and automatic-gain-control AGC, circuits. At the second detector $D_1$, there will occur the normal IF, the scrambled-polarity video signal, the normal sound and, if used, the occasional missing video carrier. The detected signal at $D_1$ produces the complete synchronizing signal which is applied to the conventional receiver synchronization circuits after being separated, as is well-known, in the conventional synchronization separator S.S. The intermediate frequency is also applied, before detection, by conductor 2 to a filter F which removes enough modulation so that a further carrier oscillator C.O. may become locked synchronously to the video carrier. At the locked oscillator C.O. a constant carrier in phase signal is present which is applied first, by conductor 4, to the input of a switching device or circuit $S_3$, which may be of the same well-known type described in connection with the switching circuit $S_2$ of FIG. 4, and, secondly, by conductor 6, to a further mixer $M_3$. In the mixer $M_3$, the oscillations of the locked oscillator C.O are added to the filtered sound-IF signal fed to the mixer $M_3$ by conductor 8, producing by detection at $D_3$ a beat of the two carriers, resulting in the conventional 4½ megacycle signal which is then treated conventionally as in the sound system of all television receivers. This arrangement, moveover, has the added advantage of eliminating the buzzing sound so annoying in intercarrier systems when too deep a modulation is present.

The synchronization signal is also fed to the switching circuit $S_3$ by conductor 10 automatically and synchronously to cause the circuit $S_3$ to switch the locked carrier oscillator C.O. off from the further mixer $M_2$ and detector $D_2$ for the duration of each and every synchronizing pulse. The coding signal along the telephone line T of FIG. 4, or other subscriber coding channel, will be applied at T' in FIG. 5 to the switching circuit or device $S_3$, however, to turn off the switching circuit $S_3$ synchronously with the polarity-reversal code periods of FIG. 3. Only during the polarity-reversal code periods of FIG. 3, therefore, will the receiver-generated carrier of the locked oscillator C.O. be permitted to flow through the switching circuit $S_3$ to the mixer $M_2$, where it will be then combined or added with the normal IF signal, restoring or re-reversing the reversed polarity portions of the IF signal and thus unscrambling and making usable the video signal.

At the times the switch $S_1$ of FIG. 4 operates completely to suppress the main video carrier, the received signal in FIG. 5 is equivalent to a deep white signal. The addition of the carrier oscillations of the locked oscillator C.O. will change the picture to a deep black which will be unnoticed on the screen of the subscriber set of FIG. 5, but will produce a strong flash on the screen of other non-subscriber receivers.

In order to interest non-subscribers in requesting subscription, of course, a few moments of unscrambled transmission could be effected. Another desirable enticement can also be achieved in accordance with the present invention. A low-level commercial or other advertising video intelligence from $V^1$, FIG. 4, could also be superimposed on the main carrier, but with its video polarity reversed synchronously with the video polarity reversals of FIG. 3, before the modulator of the transmitter $T_x$. Thus in FIG. 4, the auxiliary video intelligence is shown polarity-reversed by a switching circuit $S_3'$, indicated by dotted lines as synchronously operated with the operation of the code polarity-reversing switching circuit $S_2$. When the auxiliary carrier from the auxiliary transmitter Aux $T_x$ combines with the main carrier, the appropriately polarity-reversed auxiliary video intelligence from $V^1$ will be rendered of proper polarity throughout while the main video signal is being scrambled. A non-subscribing receiver will thus receive the auxiliary video intelligence commercial but not the main program. The subscriber will see the main program unscrambled as in FIG. 5, but the unscrambled commercial or other auxiliary video intelligence will be scrambled by the receiver oscillator C.O. and thus not apparent on the screen of the receiver. Since the quality of the commercial need not be high, the commercial or auxiliary video intelligence may be transmitted as a low-percent modulation, thus negligibly affecting the main image.

In connection with the coding and decoding signals, they will be composed basically of pulses, as before stated, with a recurrence frequency, which is desirably randomly varied as also before-discussed, preferably in the 30 to 60 cycle range. The band pass requirements of such signals being low, a low-quality transmission line or transmission system can serve for transmitting the decoding signals to the subscriber. Regular accounting for the use of the decoding signal channel may be effected so that the subscriber may be conveniently billed for using these facilities.

The concept of transmitting more than one program upon the same television channel, wherein, if desired, one program may be scrambled so as to be unintelligible to non-subscriber receivers while another program may be entirely intelligible at non-subscriber receivers, may, however, be practiced by other means than with the auxiliary carrier technique of FIGS. 1 through 4. The before-described other ways of reversing video polarity, as in the video circuits prior to the transmitter, later described in connection with FIG. 6, may also be used to effect this novel multi-transmission feature of the invention. Instead of merely polarity-reversing complete line groups of the video programs, moreover, the polarity of portions of a line, such as one or more sections thereof or sub-areas or dots of the lines, such as are employed in well-known color television systems, could similarly be reversed in accordance with a code pattern enabling more than just two programs to be transmitted. In the system of FIG. 6, synchronizing pulses, corresponding to a portion of the frame, such as one or more lines, sub-areas or dots of lines, are fed in code sequence from the source C.S.P. to control a switch or switching circuit $S_2$, as is well-known, in order to reverse the polarity of the output of the video amplifiers V by feeding the same in code sequence through the phase-reversal path P instead of along the property-polarity path 12 to modulate the transmitter $T_x$. An unscrambled auxiliary program $V^1$ is also simultaneously transmitted, the term "simultaneously" being used to embrace time-sharing transmissions, as well. Decoding at the receiver, analogous to FIG. 5, would obviously permit a subscriber to receive scrambled programs, such as from V, and a non-subscriber to receive regular programs, such as from $V^1$. This enables the public service of regular channels to be unimpeded by simultaneous use of the same channels for private or subscriber purposes, accomplishing a very desirable end.

It is to be understood that since it is the concept of connecting and operating in a new manner well-known components of apparatus to achieve these novel results that underlie the features of invention herein, and not the apparatus components themselves, circuit details of the components are not shown in order not to confuse the application by detracting from the real inventive features. The circuit details, of course, are embodied in standard equipment on the market and are widely published in well-known texts, articles and patents with which those skilled in this art are entirely familiar.

Further modifications will occur to those skilled in the art and all such are considered to fall within the spirit and scope of the invention as claimed.

What is claimed is:

1. Apparatus of the character described having, in combination, means for generating a plurality of successive groups of intelligence signals, means for reversing the polarity of the signals during preselected time intervals only during predetermined groups of the plurality of groups, thereby to produce over the plurality of groups resultant scrambled intelligence signals, means for generating successive groups of auxiliary intelligence signals, means for simultaneously transmitting the resultant scrambled intelligence signals and the auxiliary intelligence signals along a common channel, means for receiving the transmitted signals, and means cooperative with the receiving means for re-reversing the polarity of the scrambled intelligence signals during the said preselected time intervals, thereby to unscramble the same, while rendering the auxiliary intelligence signals unintelligible.

2. Apparatus of the character described having, in combination, means for generating a plurality of successive groups of intelligence signals, means for reversing the polarity of the signals during preselected time intervals only during predetermined groups of the plurality of groups, thereby to produce over the plurality of groups resultant scrambled intelligence signals, means for generating successive groups of auxiliary intelligence signals, and means for simultaneously transmitting the resultant scrambled intelligence signals and the auxiliary intelligence signals along a common channel.

3. Television apparatus of the character described having, in combination, means for generating a first plurality of successive frames of video signals, means for generating a second plurality of successive frames of auxiliary video signals, means for simultaneously modulating a transmitter with the first and second pluralities of video signals in order to transmit the same along a common carrier wave, and means for reversing the polarity of the signals of one of the pluralities of signals during preselected time intervals only during predetermined frames of the said one plurality of frames, thereby to produce over the said one plurality of frames resultant scrambled video signals.

4. Television apparatus of the character described having, in combination, means for generating a plurality of successive groups of video signals, means for reversing the polarity of the signals during preselected time intervals only during predetermined groups of the plurality of groups, thereby to produce over the plurality of groups resultant scrambled video signals, means for generating successive groups of auxiliary video signals, means for simultaneously modulating a transmitter with the resultant scrambled video signals and the auxiliary video signals in order to transmit the same along a common carrier wave, means for receiving the transmitted carrier wave, and means cooperative with the receiving means for reversing the polarity of the scrambled video signals during the said preselected time intervals, thereby to unscramble the same while rendering the auxiliary video signals unintelligible.

5. Television apparatus of the character described having, in combination, means for generating a plurality of successive groups of video signals, means for reversing the polarity of the signals during preselected time intervals only during predetermined groups of the plurality of groups, thereby to produce over the plurality of groups resultant scrambled video signals, means for generating successive groups of auxiliary video signals, and means for simultaneously modulating a transmitter with the resultant scrambled video signals and the auxiliary video signals in order to transmit the same along a common carrier wave.

6. Television apparatus of the character described having, in combination, means for generating a plurality of successive frames of video signals, means for reversing the polarity of the signals during preselected time intervals only during predetermined sub-areas of the plurality of frames, thereby to produce over the plurality of frames resultant scrambled video signals, means for generating successive frames of auxiliary video signals, and means for simultaneously modulating a transmitter with the resultant scrambled video signals and the auxiliary video signals in order to transmit the same along a common carrier wave.

7. Television apparatus of the character described having, in combination, means for generating a first plurality of successive frames of video signals, means for generating a second plurality of successive frames of auxiliary video signals, means for simultaneously modulating a transmitter with the first and second pluralities of video signals in order to transmit the same along a common carrier wave, and means for reversing the polarity of the signals of one of the pluralities of signals during preselected time intervals only during predetermined frames of the said one plurality of frames, thereby to produce over the said one plurality of frames resultant scrambled video signals, and means for suppressing the carrier wave at predetermined times.

8. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eightly degrees different from that of the main carrier wave and of amplitude corresponding substantially to that of the main carrier wave when the video-signal modulation thereof corresponds to a black picture signal, means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, means for receiving the resultant scrambled video-image carrier, and means cooperative with the receiving means and operated synchronously with the said combining means for re-reversing the polarity of the resultant carrier during the said preselected time intervals only, thereby to unscramble the video image.

9. Apparatus of the character described having, in combination, means for generating successive groups of amplitude-modulated main carrier wave of predetermined frequency, means for generating an auxiliary carrier wave of the said predetermined frequency but of phase substantially one hundred eighty degrees different from that of the main carrier and of amplitude corresponding substantially to that of the maximum signal modulation of the main carrier wave, means for selectively combining the generated main and auxiliary carrier waves at preselected time intervals only between predetermined sets of said successive groups in order to reverse the apparaent polarity of the signal during the said preselected time intervals only, thereby to produce over a plurality of the said successive groups a resultant scrambled signal carrier, means for receiving the resultant scrambled signal carrier, and means cooperative with the receiving means and operated synchronously with the said combining means for re-reversing the polarity of the resultant carrier during the said preselected time intervals only, thereby to unscramble the signal.

10. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, means for receiving the resultant scrambled video-image carrier, means cooperative with the receiving means for producing a second auxiliary carrier wave of frequency and phase appropriate to re-reverse the apparent reversed polarity of the received resultant scrambled video-image carrier when combined with the same at the said preselected time intervals, and means operated synchronously with the said combining means for selectively controlling the second auxiliary carrier-wave-producing means to combine the second auxiliary carrier wave with the received resultant scrambled video-image carrier at the said preselected time intervals only, thereby to unscramble the video image.

11. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modultation thereof corresponds to a black picture signal, means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, the said preselected time intervals being selected so that the said reversal of polarity occurs in separated groups of pairs of adjacent frames, means for receiving the resultant scrambled video-image carrier, and means cooperative with the receiving means and operated synchronously with the said combining means for re-reversing the polarity of the resultant carrier during the said preselected time intervals only, thereby to unscramble the video image.

12. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, the said preselected time intervals being selected so that the said reversal of polarity occurs in separated groups of pairs of adjacent frames, means for receiving the resultant scrambled video-image carrier, means cooperative with the receiving means for producing a second auxiliary carrier wave of frequency and phase appropriate to re-reverse the apparent reversed polarity of the received resultant scrambled video-image carrier when combined with the same at the said preselected time intervals, and means operated synchronously with the said combining means for selectively controlling the second auxiliary carrier-wave-producing means to combine the second auxiliary carrier wave with the received resultant scrambled video-image carrier at the said preselected time intervals only, thereby to unscramble the video image.

13. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, switching means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, means for receiving the resultant scrambled video-image carrier, and means cooperative with the receiving means and operated synchronously with the said switching means for re-reversing the polarity of the resultant carrier during the said preselected time intervals only, thereby to unscramble the video image.

14. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, means for independently generating auxiliary video intelligence the polarity of which is reversed at the said preselected time intervals, means for superimposing the auxiliary video intelligence upon the generated main carrier wave in order that the said resultant scrambled video-image carrier will contain, also, unscrambled auxiliary video intelligence, means for receiving the resultant scrambled video-image carrier with the unscrambled auxiliary video intelligence, and means cooperative with the receiving means and operated synchronously with the said combining means for re-reversing the polarity of the resultant carrier during the said preselected time intervals only, thereby to unscramble the said video image but, by reversing the polarity of the auxiliary video intelligence during the said preselected time intervals, effectively rendering the auxiliary video intelligence over a plurality of frames undetectable.

15. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, means for independently generating auxiliary video intelligence the polarity of which is reversed at the said preselected time intervals, means for superimposing the auxiliary video intelligence upon the generated main carrier wave in order that the said resultant scrambled video-image carrier will contain, also, unscrambled auxiliary video intelligence, means for receiving the resultant scrambled video-image carrier with the unscrambled auxiliary video intelligence, means cooperative with the receiving means for producing a second auxiliary carrier wave of frequency and phase appropriate to re-reverse the apparent reversed polarity of the received resultant scrambled video-image carrier when combined with the same at the said preselected time intervals but to reverse the polarity of the auxiliary video intelligence during the said preselected time intervals, and means operated synchronously with the said combining means for selectively controlling the second auxiliary carrier-wave-producing means to combine the second auxiliary carrier wave with the received resultant scrambled video-image carrier at the said preselected time intervals only, thereby to unscramble the video image while effectively rendering the auxiliary video intelligence over a plurality of frames undetectable.

16. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, switching means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, means for independently generating auxiliary video intelligence the polarity of which is reversed at the said preselected time intervals, means for superimposing the auxiliary video intelligence upon the generated main carrier wave in order that the said resultant scrambled video-image carrier will contain, also, unscrambled auxiliary video intelligence, means for receiving the resultant scrambled video-image carrier with the unscrambled auxiliary video intelligence, means cooperative with the receiving means for producing a second auxiliary carrier wave of frequency and phase appropriate to re-reverse the apparent reversed polarity of the received resultant scrambled video-image carrier when combined with the same at the said preselected time intervals but to reverse the polarity of the auxiliary video intelligence during the said preselected time intervals, and further switching means controlled by a subscriber code device and operated synchronously with the said combining means for selectively controlling the second auxiliary carrier-wave-producing means to combine the second auxiliary carrier wave with the received resultant scrambled video-image carrier at the said preselected time intervals only, thereby to unscramble the video image while effectively rendering the auxiliary video intelligence over a plurality of frames undetectable.

17. Apparatus of the character described having, in combination, means for generating successive groups of amplitude-modulated main carrier wave of predetermined frequency, means for generating an auxiliary carrier wave of the said predetermined frequency but of phase substantially one hundred eighty degrees different from that of the main carrier and of amplitude corresponding substantially to that of the maximum signal modulation of the main carrier wave, and means for selectively combining the generated main and auxiliary carrier waves at preselected time intervals only between predetermined sets of the said successive groups in order to reverse the apparent polarity of the signal during the said preselected time intervals only, thereby to produce over a plurality of the said successive groups a resultant scrambled signal carrier.

18. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, and means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, the occurrence of the said preselected time intervals being non-uniformly varied.

19. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degress different from that of the main carrier wave and of amplitude corresponding substantially to that of the main carrier wave when the video-signal modulation thereof corresponds to a black picture signal, and means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, the said preselected time intervals being selected so that the said reversal of polarity occurs in separated groups of pairs of adjacent frames.

20. Television apparatus of the character described having, in combination, means for generating successive frames of video-signal amplitude-modulated main carrier wave of predetermined frequency, means for generating an auxiliary carrier wave of the said predetermined frequency but of phase substantially one hundred eighty degrees different from that of the main carrier wave and of amplitude corresponding substantially to that of the main carrier wave when the video-signal modulation thereof corresponds to a black picture signal, means for selectively combining the generated main and auxiliary carrier waves at preselected time intervals only between predetermined sets of the said successive frames in order to reverse the apparent polarity of the video signal during the said preselected time intervals only, thereby to produce over a plurality of frames a resultant scrambled video-image carrier, means for independently generating auxiliary video intelligence the polarity of which is reversed at the said preselected time intervals, and means for superimposing the auxiliary video intelligence upon the generated main carrier wave in order that the said resultant scrambled video-image carrier will contain, also, unscrambled auxiliary video intelligence.

21. Television apparatus for use with a system producing successive frames of a scrambled video-image carrier the apparent polarity of which is reversed during preselected time intervals only between predetermined sets of the said successive frames, comprising, means for receiving the scrambled video-image carrier, means cooperative with the receiving means for producing an auxiliary carrier wave of frequency and phase appropriate to re-reverse the apparent reversed polarity of the received carrier when combined with the same at the said preselected time intervals, and means operated synchronously with the occurrence of the said preselected time intervals for selectively controlling the auxiliary carrier-wave-producing means to combine the auxiliary carrier wave with the received carrier at the said preselected time intervals only, thereby to unscramble the video image.

22. Television apparatus for use with a system producing successive frames of a scrambled video-image carrier the apparent polarity of which is reversed during preselected time intervals only between predetermined sets of the said successive frames, comprising, means for receiving the scrambled video-image carrier, means cooperative with the receiving means for producing an auxiliary carrier wave of frequency and phase appropriate to re-reverse the apparent reversed polarity of the received carrier when combined with the same at the said preselected time intervals, and switching means controlled by a subscriber code device and operated synchronously with the occurrence of the said preselected time intervals for selectively controlling the auxiliary carrier-wave-producing means to combine the auxiliary carrier wave with the received carrier at the said preselected time intervals only, thereby to unscramble the video image.

References Cited in the file of this patent

UNITED STATES PATENTS

| | | |
|---|---|---|
| 2,414,101 | Hogan | Jan. 14, 1947 |
| 2,510,046 | Ellett | May 30, 1950 |
| 2,769,025 | Hoffmann | Oct. 30, 1956 |

FOREIGN PATENTS

| | | |
|---|---|---|
| 1,034,776 | France | Apr. 15, 1953 |

OTHER REFERENCES

Appendix before the F.C.C.—In the matter of: Amendment of Part 3 of the Commission's Rules and Regulations (Radio Broadcast Services) to Provide for Subscription Television Service—Appendix to the comments of Zenith and Teco—76 pp.